United States Patent [19]

Tamari

[11] Patent Number: 5,589,261
[45] Date of Patent: Dec. 31, 1996

[54] PERPENDICULAR MAGNETIC FILM, PROCESS FOR PRODUCING THE SAME AND MAGNETIC RECORDING MEDIUM HAVING THE SAME

[75] Inventor: Kousaku Tamari, Hiroshima, Japan

[73] Assignee: Toda Kogyo Corporation, Japan

[21] Appl. No.: 328,135

[22] Filed: Oct. 24, 1994

Related U.S. Application Data

[63] Continuation of Ser. No. 36,209, Mar. 23, 1993, abandoned.

[30] Foreign Application Priority Data

Mar. 30, 1992 [JP] Japan .................................. 4-105460

[51] Int. Cl.$^6$ .................. G11B 5/66; B32B 5/16; B05D 5/12; C23C 14/00
[52] U.S. Cl. .............. 428/332; 428/336; 428/694 T; 428/694 TM; 428/694 GT; 428/694 XS; 428/900; 427/127; 427/128; 427/130; 204/192.2
[58] Field of Search ................ 428/694 T, 694 GT, 428/694 TM, 900, 694 XS, 332, 336; 427/127, 128, 130; 204/192.2

[56] References Cited

U.S. PATENT DOCUMENTS 4,975,324  12/1990  Torii et al. ........................... 428/329

FOREIGN PATENT DOCUMENTS

| 51-119999 | 10/1976 | Japan . |
| 62-267949 | 11/1987 | Japan . |
| 63-47359 | 2/1988 | Japan . |
| 3-17813 | 1/1991 | Japan . |
| 317813 | 1/1991 | Japan . |
| 3-188604 | 8/1991 | Japan . |
| 4-10509 | 1/1992 | Japan . |

OTHER PUBLICATIONS

Database WPI Week 8603, Derwent Publications Ltd., London, GB; AN 86-018266 & JP-A-60 242 514 (Toshiba) 2 Dec. 1985.
Database WPI Week 8836, Derwent Publications Ltd., London, GB; AN 88-253409 & JP-A-63 183 608 (Hitachi Maxell) 29 Jul. 1988.

*Primary Examiner*—Leszek Kiliman
*Attorney, Agent, or Firm*—Nixon & Vanderhye

[57] ABSTRACT

Disclosed herein is a perpendicular magnetic film comprising at least two of a (A)/(B) unit or (B)/(A) unit obtained by disposing a spinel type crystal layer (A) represented by the following general formula:

$$A_xFe_{3-x}O_4$$

(wherein A is a transition metal, and x is not more than 1), and
a spinel type crystal layer (B) represented by the following general formula:

$$B_yCo_{3-y}O_4$$

(wherein B is a transition metal, and y is not more than 1), in the order of (A) and (B) or (B) and (A).

12 Claims, 6 Drawing Sheets

PERPENDICULAR MAGNETIC FILM, PROCESS FOR PRODUCING THE SAME AND MAGNETIC RECORDING MEDIUM HAVING THE SAME

This is a Rule 62 File Wrapper continuation of application Ser. No. 08/036,209, filed Mar. 23, 1993, now abandoned.

BACKGROUND OF THE INVENTION

The present invention relates to a perpendicular magnetic film, a process for producing the same, and a magnetic recording medium having the same. More particularly, the present invention relates to a perpendicular magnetic film which is suitable as a perpendicular magnetic recording material, which is stable against oxidation, which has excellent perpendicular magnetic anisotropy and which is composed of crystals having a small average grain size, a process for producing the same, and a magnetic recording medium having the same.

With recent demand for miniaturization and higher reliability of information processing devices and systems, perpendicular magnetic films have been rapidly developed and put to practical use. A perpendicular magnetic film which is suitable for high-density recording is required to have a large coercive force and a large saturation magnetization in the direction perpendicular to the film surface.

The perpendicular magnetic film is further required to be composed of crystal grains having as small a crystal grain size as possible or to be amorphous, because if the average grain size of the crystals which constitute the perpendicular magnetic thin film is large, the scattering of light takes place on the interfaces of the crystal grains, which causes large noise.

In addition, since the magnetic characteristics of a magnetic recording medium are deteriorated owing to oxidation by the oxygen in the air, the perpendicular magnetic film is required to be stable against oxidation.

Furthermore, when the perpendicular magnetic film is used as a recording layer of a magneto-optical recording medium in which recording and reproduction of information is carried out by using a light beam such as a laser beam, the medium is required to have as high magneto-optical characteristics such as the Faraday rotation angle as possible. With the recent demand for higher-density recording, a tendency is shown that the recorded carrier signals have a high frequency, in other words, that the wavelength of the recorded carrier signals is short. In the case of magneto-optical recording, a recorded bit size is determined by the wavelength of a laser beam, and the shorter the wavelength, the smaller the bit size becomes. A material having a large Faraday rotation angle in a short wavelength region of not more than 600 nm is, therefore, strongly demanded.

Examples of the perpendicular magnetic recording films and processes for producing the same which have conventionally been disclosed are as follows.

(1) A process for producing a cobalt ferrite spinel film, which comprises forming a spinel film by sputtering onto a substrate of a low temperature in an oxidizing air by using an alloy target composed mainly of Co and Fe (Japanese Patent Application Laid-Open (KOKAI) No. 63-47359). In Japanese Patent Application Laid-Open (KOKAI) No. 63-47359, the description of "When a reactive sputtering is carried out in an oxidizing air by using an alloy target composed mainly of Co and Fe, a cobalt.ferrite spinel film represented by $Co_xFe_{3-x}O_4$, (wherein $0.5 \leq x \leq 1.05$) is formed on the substrate. In this case, even if the surface temperature is as low as about 200° C., a spinel film having a good crystallizability is obtained." is disclosed.

(2) A magnetic recording medium comprising a substrate, an under layer of a crystalline film having a spinel crystalline structure, and a magnetic recording layer of a spinel ferrite crystalline film, wherein the lattice constant of the under layer is larger than that of the magnetic recording layer (Japanese Patent Application Laid-Open (KOKAI) No. 3-17813). The description of "The under layer is composed of a material represented by the following general formula:

$$AB_2O_4$$

wherein A is a metal element of divalent ions and at least one selected from the group consisting of Mg, Mn, Co, Ni, Cu, Zn, Fe, etc., and B is a metal element of trivalent ions and at least one selected from the group consisting of Cr, In, Rh, Sc, Tl, Fe, etc. The magnetic recording layer 3 is composed of the material represented by the following general formula:

$$AB_xFe_{3-x}O_4$$

wherein A and B are the same as in the above-mentioned general formula, and $0 \leq x < 2$." is disclosed in Japanese Patent Application Laid-Open (KOKAI) No. 3-17813.

(3) An oriented film of oxide crystals represented by the following general formula:

$$A_xB_{3-x}O_y$$

wherein A is at least one selected from the group consisting of Mn, Co, Ni, Cu, Mg, Cr, Zn, Li and Ti; B is Fe or Al;, $0.5 \leq x \leq 2.0$ and $2.5 \leq y < 4$, wherein the ratio $(I_{111}/I_{222})$ of the reflective peak intensity $I_{111}$ of the crystal face (111) and the reflective peak intensity $I_{222}$ of the crystal face (222) is less than 0.2 when the X-ray diffraction peak is indexed on the assumption that the film has a spinel crystalline Structure- (Japanese Patent Application Laid-Open (KOKAI) No. 3-188604).

(4) A process for producing a cobalt ferrite film comprising the steps of forming a multi-layer metal film by laminating at least two of Co layer and Fe layer on a substrate, and heat-treating the obtained multi-layer film in an air containing oxygen (Japanese Patent Application Laid-Open (KOKAI) No. 4-10509).

There are the following description in Japanese Patent Application Laid-Open (KOKAI) No. 4-10509.

"The total thickness of the Co layer and the Fe layer in the multi-layer metal film is not more than 100 Å. This is because if the total thickness of the Co layer and Fe layer exceeds 100 Å, it is difficult to produce a cobalt ferrite film having a large Kerr rotation angle."

"Seven kinds of multilayers were formed on a glass substrate 3 (Coning 7059, produced by CONING) by sputtering in Ar while using a single Co target and a single Fe target under the following condition, as shown in FIG. 1.

Sputtering condition:

Total sputtering pressure: 2 mtorr

Sputtering current: 0.2 A

Substrate temperature: room temperature

In each of the multilayers, the thickness ratio of a Co layer 1 and an Fe layer 2 was 1:2, and the total film thickness was constantly 2000 Å. These multilayers obtained were 1 layer of (Co/Fe=660 Å/1340 Å), 2 layers of (Co/Fe=330 Å /670

Å), 4 layers of (Co/Fe=165 Å/335 Å), 8 layers of (Co/Fe= 82.5 Å/167.5 Å), 10 layers of (Co/Fe=66 Å/134 Å), 20 layers of (Co/Fe=33 Å/67 Å), and 40 layers of (Co/Fe=17 Å/33 Å). Each of the multilayers was heat-treated in an electric oven in the air in the heat treatment pattern shown in FIG. 3. More specifically, the film was heated at a high raising rate until 300° C., and then heated at a raising rate of 100° C./hr until 500° C. The film was heated at 500° C. for 2 hours, and was then gradually cooled. Thus, a cobalt ferrite film was formed on the glass substrate"

Namely, the cobalt ferrite films disclosed in Japanese Patent Application Laid-Open (KOKAI) No. 4-10509 are a multilayer (in-plane magnetic film) composed of a cobalt layer and a ferrite layer and a film (perpendicular magnetic film) composed of a cobalt.ferrite oxide. Each of the multilayer metal films is heat-treated at a temperature of not lower than 500° C. for not less than 2 hours, thereby obtaining a cobalt.ferrite oxide film.

(5) An amorphous alloy film such as a Gd-Co film and a Tb—Fe film, composed of a rare earth metal and a transition metal (Japanese Patent Application Laid-Open (KOKAI) No. 51-119999) and a magneto-plumbite oxide thin film such as a barium ferrite film (Japanese Patent Application Laid-Open (KOKAI) No. 62-267949).

While the above-mentioned amorphous alloy film is advantageous in that the noise produced is small because there is no grain boundary, it is disadvantageous in that the magneto-optical characteristic (Kerr rotation angle) is lowered to less than 0.3 deg. which is necessary in practical use, when a laser beam having a short wavelength is used, and in that the film is unstable against oxidation, that is, it is liable to be oxidized. Further, the above-mentioned oxide thin film is advantageous in that it is stable against oxidation, but it is disadvantageous in that since the grain size is large, large noise is produced. The crystallinity of a film has a close relationship to various characteristics such as perpendicular magnetic anisotropy and magneto-optical characteristics. In order to improve various characteristics of a film, a high-temperature heat-treating process is essential in the formation of the film. For example, the substrate is heated to not lower than 500° C., or after forming a film on the substrate at a low temperature such as not higher than 400° C. the obtained film is heat-treated at a high temperature such as not lower than 500° C. As a result, crystal grains necessarily grow. When the average grain size becomes large, light greatly scatters, resulting in large noise at the time of reading the information recorded in the magneto-optical recording.

In order to heat the substrate to not lower than 500° C., the substrate itself is required to have a high heat resistance. Nevertheless, the heat resistance of a material which is now generally used for the substrate of a perpendicular magnetic recording medium such as polycarbonate and epoxy resin is insufficient, so that the material for the substrate is restricted, which is disadvantageous from the point of view of industry and economy.

None of the above-mentioned films sufficiently satisfy all requirements such as excellent stability against oxidation, excellent perpendicular magnetic anisotropy and crystals of a small average grain size.

Accordingly, a perpendicular magnetic film which has excellent perpendicular magnetic anisotropy at a temperature of not higher than 500° C. and which is composed of an oxide having a small average grain size, is now in strong demand.

As a result of various studies undertaken by the present inventor, it has been found that (1) a perpendicular magnetic film obtained by forming a unit (A)/(B) or (B)/(A) composed of a spinel type crystal layer (A) containing Fe as the main ingredient and a spinel type crystal layer (B) containing Co as the main ingredient and disposed in the order of (A) and (B) or (B) and (A), and laminating at least two such units, or (2) a perpendicular magnetic film obtained by forming a unit (A')/(C)/(B')/(C) or (B')/(C)/(A')/(C) composed of a spinel type crystal layer (A') containing Fe as the main ingredient, a spinel type crystal layer (B') containing Co as the main ingredient, and a spinel type crystal layer (C) containing a mixture of Fe and Co as the main ingredient and disposed in the order of (A'), (C), (B') and (C) or (B'), (C), (A') and (C), and laminating at least two such units, is stable against oxidation (is excellent in an oxidation resistance), has excellent perpendicular magnetic anisotropy and has a small average grain size, and as a result, it is suitable as a magneto-optical recording material. On the basis of this finding, the present invention has been achieved.

SUMMARY OF THE INVENTION

It is an object of the present invention to provide a perpendicular magnetic film which is stable against oxidation, which has an excellent perpendicular magnetic anisotropy and which is composed of spinel type crystals having a small average grain size.

More particularly, it is an object of the present invention to provide a perpendicular magnetic film which has a Faraday rotation angle of not less than 0.4 deg/μm in a short wavelength region of 450 to 600 nm, in which the average grain size of the spinel crystals is 30 to 100 Å and which is composed of grains having a sharp grain size distribution.

To achieve these objects, in a first aspect of the present invention, there is provided a perpendicular magnetic film comprising at least two of a (A)/(B) unit or a (B)/(A) unit obtained by laminating a spinel type crystal layer (A) represented by the following general formula:

$$A_xFe_{3-x}O_4$$

(wherein A is a transition metal such as Co, Ni, Mn, etc., and x is not more than 1), and
a spinel type crystal layer (B) represented by the following general formula:

$$B_yCo_{3-y}O_4$$

(wherein B is a transition metal such as Fe, Ni, Mn, etc., and y is not more than 1),
in the order of (A) and (B) or (B) and (A).

To achieve the objects, in a second aspect of the present invention, there is provided a perpendicular magnetic film comprising at least two of a (A')/(C)/(B')/(C) unit or a (B')/(C)/(A')/(C) unit obtained by forming a spinel type crystal layer (A') represented by the following general formula:

$$A_xFe_{3-x}O_4$$

(wherein A is a transition metal such as Co, Ni, Mn, etc., and x is not more than 1),
a spinel type crystal layer (C) represented by the following general formula:

$$A'_a(Fe_{1-z}Co_z)_{3-a}O_4$$

(wherein A' is a transition metal such as Ni, Mn, etc., a is not more than 1, and z is more than 0 and less than 1 and changes continuously between 0 and 1), and a spinel type crystal layer (B') represented by the following general formula:

$$B_yCo_{3-y}O_4$$

(wherein B is a transition metal such as Fe, Ni, Mn, etc., and y is not more than 1),
in the order of (A'), (C), (B') and (C) or (B'), (C), (A') and (C).

In a third aspect of the present invention, there is provided a process for producing a perpendicular magnetic film defined in the 2nd aspect, comprising the steps of laminating a spinel type crystal layer containing Fe as a main ingredient and a spinel type crystal layer containing Co as a main ingredient alternately, and heat-treating the multilayer at 250° to 400° C. for 0.5 to 3.0 hours.

In a fourth aspect of the present invention, there is provided a magnetic recording medium comprising a substrate, and a perpendicular magnetic film formed on the substrate, the perpendicular magnetic film being composed of at least two of a (A)/(B) unit or a (B)/(A) unit obtained by laminating a spinel type crystal layer (A) represented by the following general formula:

$$A_xFe_{3-x}O_4$$

(wherein A is a transition metal such as Co, Ni, Mn, etc., and x is not more than 1), and
a spinel type crystal layer (B) represented by the following general formula:

$$B_yCo_{3-y}O_4$$

(wherein B is a transition metal such as Fe, Ni, Mn, etc., and y is not more than 1),
in the order of (A) and (B) or (B) and (A).

In a fifth aspect of the present invention, there is provided a magnetic recording medium comprising a substrate, and a perpendicular magnetic film formed on the substrate, the perpendicular magnetic film being composed of at least two of a (A')/(C)/(B')/(C) unit or a (B')/(C)/(A')/(C) unit obtained by forming a spinel type crystal layer (A') represented by the following general formula:

$$A_xFe_{3-x}O_4$$

(wherein A is a transition metal such as Co, Ni, Mn, etc., and x is not more than 1),
a spinel type crystal layer (C) represented by the following general formula:

$$A'_a(Fe_{1-z}Co_z)_{3-a}O_4$$

(wherein A' is a transition metal such as Ni, Mn, etc., a is not more than 1, and z is more than 0 and less than 1 and changes continuously between 0 and 1), and
a spinel type crystal layer (B') represented by the following general formula:

$$B_yCo_{3-y}O_4$$

(wherein B is a transition metal such as Fe, Ni, Mn, etc., and y is not more than 1),
in the order of (A'), (C), (B') and (C) or (B'), (C), (A') and (C).

DETAILED DESCRIPTION OF THE INVENTION

Figure 1:
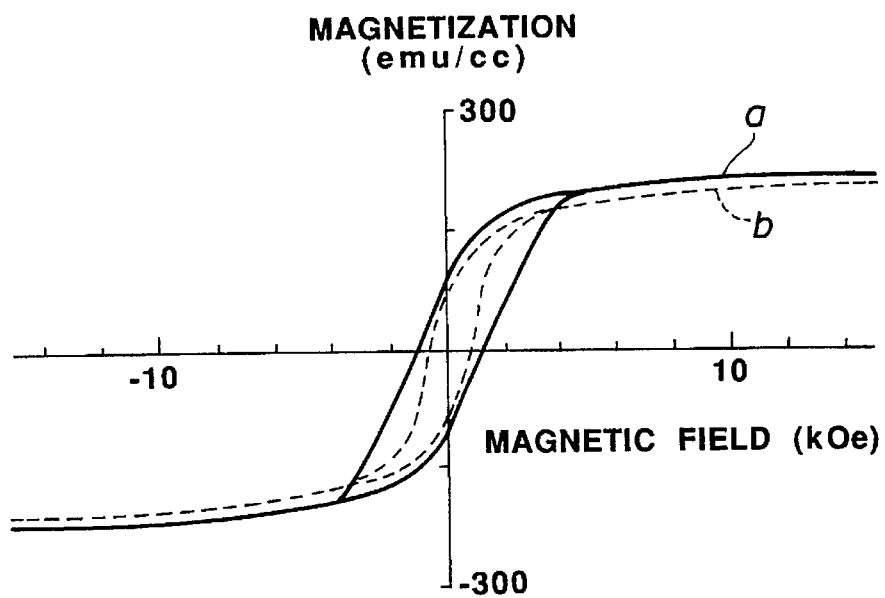
FIG. 1 is the magnetization curve of the laminated perpendicular magnetic film obtained in Example 1.

A spinel type crystal layer (A) containing Fe as the main ingredient in the present invention is composed of a spinel type crystal represented by the following general formula:

$$A_xFe_{3-x}O_4$$

wherein A is a transition metal such as Co, Ni, Mn, etc., and $0 \leq x \leq 1$.

A spinel type crystal layer (B) containing Co as the main ingredient in the present invention is composed of a spinel type crystal represented by the following general formula:

$$B_yCo_{3-y}O_4$$

wherein B is a transition metal such as Fe, Ni, Mn, etc., and $0 \leq y \leq 1$.

One unit in the laminated perpendicular magnetic film of the present invention is composed of the spinel type crystal layer (A) containing Fe as the main ingredient and the spinel type crystal layer (B) containing Co as the main ingredient. The thickness of one unit is 40 to 1000 Å, preferably more than 100 Å and not more than 500 Å, more preferably more than 100 Å and not more than 300 Å. If the thickness of one unit exceeds 1000 Å or it is less than 40 Å, it is difficult to obtain a perpendicular magnetic film according to the present invention.

The thickness of the spinel type crystal layer (A) containing Fe as the main ingredient is preferably in the range of 0.5 to 4 times, more preferably 1.5 to 3 times the thickness of the spinel type crystal layer (B) containing Co as the main ingredient. If the thickness of the spinel type crystal layer (A) is less than 0.5 time that of the spinel type crystal layer (B), the saturation magnetization has a tendency to decrease. Especially, when the perpendicular magnetic film of the present invention has as a intermediate layer a spinel type crystal layer (C) containing a mixture of Fe and Co as the main ingredient, if the thickness of the spinel type crystal layer (A) is less than 0.5 time that of the spinel type crystal layer (B), it is difficult to obtain a Faraday rotation angle large enough for practical use. On the other hand, in such case, if the thickness of the spinel type crystal layer (A) exceeds 4 times that of the spinel type crystal layer (B), the in-plane magnetization is so large that it is difficult to obtain a perpendicular magnetic film. From the points of view of saturation magnetization, the thickness of the spinel type crystal layer (A) is preferably 2.0 to 3.0 times that of the spinel type crystal layer (B), thereby a perpendicular magnetic film having a saturation magnetization of about 180 to 270 emu/cc.

The laminated perpendicular magnetic film of the present invention is composed of at least two units of (A)/(B) or (B)/(A) obtained by laminating the spinel type crystal layer (A) containing Fe as the main ingredient and the spinel type crystal layer (B) containing Co as the main ingredient in the order of (A) and (B) or (B) and (A). Since the thickness of the laminated perpendicular magnetic film is less than about 5000 Å, preferably 500 to 3000 Å in practical use, the number of units is determined by the desirable thickness of the laminated perpendicular magnetic film. The preferred number of units is generally 2 to 30.

The spinel type crystal layer (C) containing a mixture of Fe and Co as the main ingredient (hereinunder referred to as "intermediate layer") is composed of a spinel type crystal represented by the following general formula:

$$A'_a(Fe_{1-z}Co_z)_{3-a}O_4$$

wherein A' is a transition metal such as Ni, Mn, etc., $0 \leq a \leq 1$, $0 \leq z \leq 1$ and z changes continuously between 0 and 1 in the intermediate layer, i.e., z increases between 0 to 1 from the layer (A) side to the layer (B) side of the intermediate layer, at the layer (A) side thereof z being 0 and at the layer (B) side thereof z being 1.

One unit of the perpendicular magnetic film having the intermediate layer (C) is obtained by disposing the intermediate layer (C) between a spinel type crystal layer (A') represented by the following general formula:

$$A_xFe_{3-x}O_4$$

(wherein A and x are the same as defined in the spinel type crystal layer (A)) and
a spinel type crystal layer (B') represented by the following general formula:

$$B_yCo_{3-y}O_4$$

(wherein B and y are the same as defined in the spinel type crystal layer (B)), and disposing the intermediate layer (C) on the opposite side of the layer (B') to the layer (A'), so that the layer structure is (A'), (C), (B') and (C) or (B'), (C), (A') and (C) in the order.

The spinel type crystal layer (C) containing a mixture of Fe and Co as the main ingredient is a layer in which Co exists with a concentration gradient. The thickness of the intermediate layer (C) has a tendency to increase when the annealing temperature becomes higher and the annealing time becomes longer.

The total thickness of the intermediate layers (C) in one unit is not less than 1.0 time, preferably not less than 2.0, more preferable not less than 3.0 times the total thickness of the spinel type crystal layers (A') and (B'). On the other hand, the upper limit of the total thickness of the intermediate layers (C) in the repeated one unit is preferably not more than 98% based on the thickness of the repeated one unit thereof. As the thickness of the intermediate layer (C) becomes larger, the magnetic anisotropy becomes larger, which is preferable for a perpendicular magnetic film.

The substrate usable in the present invention is composed of a metal such as Al, an Al alloy and stainless steel, or a glass such as soda glass, borosilicate glass, barium borosilicate glass and almuninosilicate glass. The thickness of the substrate is 0.1 to 2 mm.

The perpendicular magnetic film of the present invention is obtained by a known method such as a reactive sputtering method in which metal targets (Fe and Co) are sputtered in an oxidizing air, a direct method in which an oxidized film is directly formed from sintered targets of $Fe_3O_4$ and $Co_3O_4$; and a reactive evaporating method in which metals (Fe and Co) are evaporated in an oxidizing air.

Reactive sputtering, for example, is carried out by introducing oxygen gas together with an inactive gas such as argon into a sputtering apparatus using a target which contains Fe as the main ingredient and a target which contains Co as the main ingredient. The pressure of the inert gas at the time of sputtering is 1 to 50 mTorr. The substrate temperature is not lower than 100° C. preferably 200° to 400° C. If the substrate temperature is lower than 100° C., an oxide other than a spinel type crystal containing Fe as the main ingredient, such as hematite is apt to be produced on the substrate surface, so that it is difficult to stably produce a spinel type crystal layer containing Fe as the main ingredient.

The spinel type crystal layer (C) represented by the general formula: $A'_a(Fe_{1-z}Co_z)_{3-a}O_4$, wherein A' and z are the same as defined above is produced by annealing the multilayer composed of at least two of the (A)/(B) unit or (B)/(A) unit at a specific temperature. The annealing temperature is 250° to 400° C., preferably 300° to 350° C. and the annealing time is 0.5 to 3.0 hours, preferably 0.5 to 2.0 hours. If the annealing temperature is lower than 250° C. and the annealing time is shorter than 0.5 hour, it is difficult to produce the spinel type crystal layer (C). On the other hand, if the annealing temperature is higher than 400° C. and the annealing time is longer than 3.0 hours, the above-described unit structure is lost and, as a result, the multilayer becomes a uniform film which contains a mixture of Fe and Co as the main ingredient, so that the uniaxial anisotropy in the perpendicular direction disappears.

The annealing treatment may be carried out in air, in a vacuum or in an inert gas.

The present inventor considers the reason why a laminate film obtained by laminating the (A)/(B) unit or (B)/(A) unit composed of the spinel type crystal layer (A) containing Fe as the main ingredient and the spinel type crystal layer (B) containing Co as the main ingredient alternately at least two times becomes a perpendicular magnetic film as follows.

Since the spinel type crystal layer (B) containing Co as the main ingredient has the same spinel structure as the spinel type crystal layer (A) containing Fe as the main ingredient and has a small lattice constant (for example, the reduction ratio [{(the lattice constant of the spinel type crystal containing Fe as the main ingredient)−(the lattice constant of the spinel type crystal containing Co as the main ingredient)}/ (the lattice constant of the spinel type crystal containing Fe as the main ingredient)×100] is 3.8%), the stress-induced anisotropy, in other words, the compression stress acts to the spinel type crystal layer (A) containing Fe as the main ingredient on the interface between the spinel type crystal layer (A) containing Fe as the main ingredient and the spinel type crystal layer (B) containing Co as the main ingredient, so that the spinel type crystal layer (A) containing Fe as the main ingredient is pulled in the direction perpendicular to the film surface (in this case, in the direction of (111)). As a result, magnetic anisotropy is produced in the direction of (111) of the spinel type crystal layer (A) containing Fe as the main ingredient due to the magnetoelastic effect. In addition, although the spinning easy direction of the $Co^{2+}$ ions of octahedron ferrite is the axis (111) direction, in the case of the $Co^{2+}$ ions of cubic ferrite, since the axis (111) exists in the four directions, the spinning easy axis is not (111) but (100) when the anisotropic energy is averaged. On the interface, however, since the lattice intervals change in the direction perpendicular to the film surface, the rotational symmetry collapses and all the degeneracy of the de level is lost, so that the anisotropy disappears on the axes (111) in the perpendicular direction. As a result, the anisotropy only remains on the axis (111) in the perpendicular direction.

The present inventor considers that due to the heat diffusion of the ions in the interface therebetween, the laminated perpendicular magnetic film obtained by laminating the spinel type crystal layer (A) containing Fe as the main ingredient and the spinel type crystal layer (B) containing Co as the main ingredient alternately at least two times has more excellent perpendicular magnetic anisotropy and magneto-optical characteristics. Also, it is considered that due to the existence of the intermediate layer having an anisotropy in the direction of the axis (111), the laminated perpendicular magnetic film obtained by laminating at least two of (A')/(C)/(B')/(C) unit or (B')/(C)/(A')/(C) unit composed of the spinel type crystal layer (A') containing Fe as a main ingredient, the spinel type crystal intermediate layer (C) containing a mixture of Fe and Co as a main ingredient and the spinel type crystal layer (B') containing Co as a main ingredient, has more excellent perpendicular magnetic anisotropy and magneto-optical characteristics.

The perpendicular magnetic film of the present invention obtained by alternately laminating the spinel type crystal layers (A) containing Fe as the main ingredient and the spinel type crystal layers (B) containing Co as the main ingredient at least two times has a coercive force of 600 to 2500 Oe and a squareness of 0.3 to 0.5. In this film, the average grain size of the crystals of the film is 30 to 100 Å.

The perpendicular magnetic film of the present invention obtained by laminating at least two units obtained by disposing the spinel type crystal layer (A') containing Fe as the main ingredient, the spinel type crystal layer (B') containing Co as the main ingredient, and the spinel type crystal layer (C) containing a mixture of Fe and Co as the main ingredient in the order of (A'), (C), (B') and (C) or (B'), (C), (A') and (C) has a coercive force of 1000 to 5500 Oe, and a squareness of 0.5 to 0.9. The Faraday rotation angle in a short wavelength region of 450 to 600 nm is 0.4 to 2.0, and the average grain size is 40 to 200 Å in each of the spinel type crystal layer (A') containing Fe as the main ingredient, the spinel type crystal layer (B') containing Co as the main ingredient and the spinel type crystal layer (C) containing a mixture of Fe and Co as the main ingredient.

As is obvious from the above explanation, in the perpendicular magnetic film of the present invention, the average grain size is optimal, for example, 30 to 200 Å, so that the perpendicular magnetic film is exempt from the defects of a conventional film such as too large light scattering (which results in large noise at the time of reading in magneto-optical recording) caused by too large an average grain size, or a superparamagnetic state (which results in small saturation magnetization and small coercive force). In addition, in the perpendicular magnetic film of the present invention, the coercive force and the squareness are increased (at least 10%), and the perpendicular magnetic anisotropy is excellent.

In this way, the perpendicular magnetic film of the present invention, which is stable against oxidation, which has an excellent perpendicular magnetic anisotropy and which has improved crystallizability, is suitable as a high-density perpendicular magnetic recording material and a magneto-optical recording material.

EXAMPLES

The present invention will be explained in more detail hereinunder with reference to the following examples and comparative examples.

In the following examples and comparative examples, the magnetic characteristics were measured by using a "vibration sample magnetometer VSM-3S-15", produced by Toei Kogyo K. K. The wavelength dependency of the Faraday rotation angle was measured by a "spectral Kerr Faraday measuring apparatus BH-M800", produced by Nihon Kagaku Engineering K. K. The X-ray diffraction spectrum was obtained by using an X-ray diffraction apparatus, rotating anode-type RIGAKU RU 300" (wavelength: 1.51418 Å, ordinary output 50 kv/240 mA), produced by Rigaku Denki K. K. The average particle diameter of the crystals was obtained from the half band width of the peak in the high-angle region of the X-ray diffraction spectrum.

Example 1

In a high-frequency high-rate sputtering device (SH-250H-T06, produced by ULVAC Corp.), a glass substrate was placed with a distance of 80 mm from an Fe target and a Co target and the substrate temperature was held at 200° C. Reactive sputtering was first carried out by using the Fe target in an oxidizing air under an oxygen partial pressure $PO_2=1.32\times10^{-4}$ Torr at a deposition rate of 34 Å/min, thereby forming a spinel $Fe_3O_4$ film oriented in the direction of (111) on the glass substrate to a thickness of 200 Å as a first layer. The shutter was rotated to form a spinel $Co_3O_4$ film to a thickness of 100 Å as a second layer by sputtering the Co target at a deposition rate of 10 Å/min. These operations were alternately repeated 16 times to obtain a multilayer composed of 8 layers of spinel $Fe_3O_4$ films each having a thickness of 200 Å, and 8 layers of spinel $Co_3O_4$ films each having a thickness of 100 Å. The making power at the time of film formation was 300 W on the Fe side and 100 W on the Co side. By lowering the making power on the Co side in comparison with a later-described comparative example, the deposition rate of Co was lowered without changing the partial pressure of oxygen. In this manner, spinel $Co_3O_4$ which has a higher oxidization degree than CoO was formed.

The magnetization curve of the multilayer obtained is shown in FIG. 1. In FIG. 1, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 1, since the residual magnetization and the coercive force of the solid line a were larger than those of the broken line b, the multilayer was recognized as a perpendicular magnetic film. As to the magnetic characteristics of the perpendicular magnetic film, the coercive force was 1100 Oe and the squareness was 0.38. The average grain size of the crystals was 70 Å.

Example 2

In the same way as in Example 1, a spinel $Fe_3O_4$ film oriented in the direction of (111) and having a thickness of 100 Å was formed as a first layer and a spinel $Co_3O_4$ film having a thickness of 50 Å was formed as a second layer. 16-layered laminated perpendicular magnetic film was produced by alternately laminating the spinel $Fe_3O_4$ film and the spinel $Co_3O_4$ film.

Figure 2:
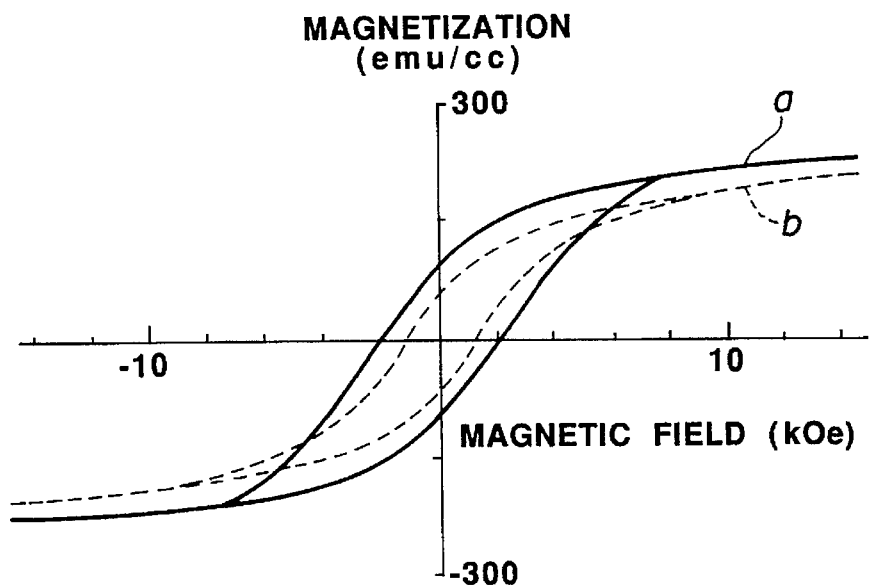
FIG. 2 is the magnetization curve of the laminated perpendicular magnetic film obtained in Example 2.

The magnetization curve of the multilayer obtained is shown in FIG. 2. In FIG. 2, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 2, since the residual magnetization and the coercive force of the solid line a were larger than those of the broken line b, the laminated perpendicular magnetic film was recognized as a perpendicular magnetic thin film. As to the magnetic characteristics of the perpendicular magnetic film, the coercive force was 2000 Oe and the squareness was 0.41. The average grain size was 50 Å.

Example 3

A spinel $Co_3O_4$ film having a thickness of 100 Å was formed as a first layer and a spinel $Fe_3O_4$ film oriented in the direction of (111) and having a thickness of 200 Å was formed as a second layer in the same way as in Example 1, except for reversing the sputtering order. These operations were repeated 16 times to obtain a multilayer composed of 8 layers of spinel $Co_3O_4$ films and 8 layers of spinel $Fe_3O_4$ films.

When the magnetization curve of the multilayer obtained was observed, the residual magnetization and the coercive force of the magnetization curve of the multilayer to which a magnetic field was applied in the perpendicular direction were larger than those of the magnetization curve of the multilayer to which a magnetic filed was applied in the in-plane direction. As a result, the multilayer was recognized as a perpendicular magnetic film. As to the magnetic characteristics of the perpendicular magnetic film, the coercive force was 1200 Oe, the saturation magnetization was 200 emu/cc and the squareness was 0.40. The average grain size was 70Å.

Example 4

In the same way as in Example 1, a spinel $Fe_3O_4$ film oriented in the direction of (111) and having a thickness of 150 Å was formed as a first layer and a spinel $Co_3O_4$ film having a thickness of 50 Å was formed as a second layer. These operations were repeated 16 times to obtain a multilayer composed of 8 layers of spinel $Fe_3O_4$ films and 8 layers of spinel $Co_3O_4$ films.

When the magnetization curve of the multilayer obtained was observed, the residual magnetization and the coercive force of the magnetization curve of the multilayer to which a magnetic filed was applied in the perpendicular direction were larger than those of the magnetization curve of the multilayer to which a magnetic filed was applied in the in-plane direction. As a result, the multilayer was recognized as a perpendicular magnetic thin film. As to the magnetic characteristics of the perpendicular magnetic film, the coercive force was 1500 Oe, the saturation magnetization was 240 emu/cc and the squareness was 0.40. The average grain size was 50 Å.

Example 5

Figure 11:
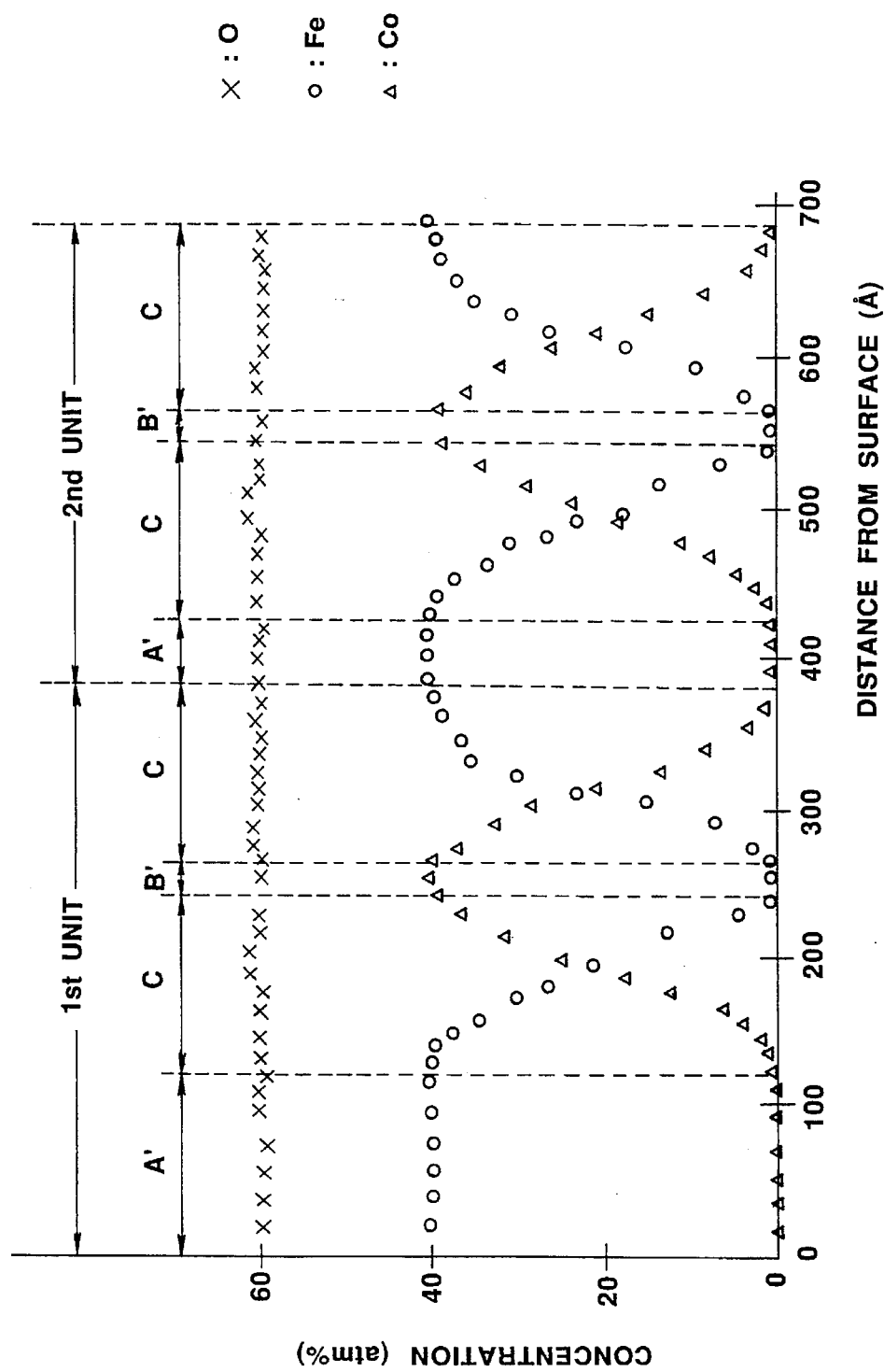
FIG. 11 is the concentration curve of each of Fe and Co in the intermediate layer (C) of the laminated perpendicular magnetic film obtained in Example 5.

The multilayer obtained in Example 1 was annealed at 350° C. for 2 hours in air. When the peak in the small-angle region of the X-ray diffraction spectrum which shows the lamination structure was observed in comparison with that before the multilayer had been annealed, the peak value after the annealing treatment was reduced. This shows that the annealing treatment caused relative diffusion of $Fe_3O_4$ and $Co_3O_4$, thereby forming the two intermediate layers (C) (240 Å based on one unit) containing $Fe_3O_4$ and $Co_3O_4$ as a solid solution between the layer (A') (40 Å based on one unit) containing $Fe_3O_4$ and the layer (B') (20 Å based on one unit) containing $Co_3O_4$. The concentration gradient of each of Fe and Co in the outermost unit and second unit therefrom of the intermediate layer (C) obtained was measured by ESCA (Electron Spectroscopy for Chemical Analysis), and the result is shown in FIG. 11.

Figure 3:
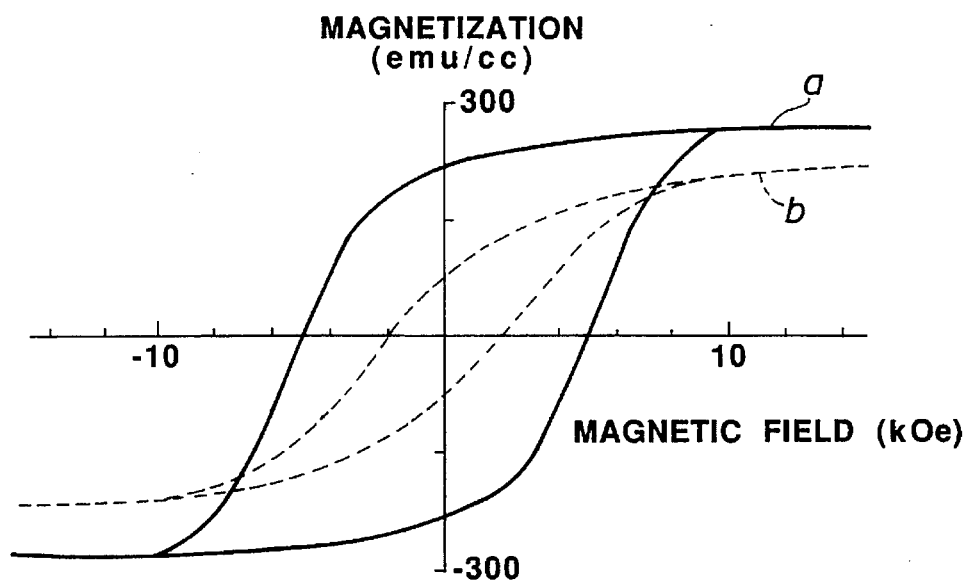
FIG. 3 is the magnetization curve of the laminated perpendicular magnetic film obtained in Example 5.

The magnetization curve of the multilayer obtained is shown in FIG. 3. In FIG. 3, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 3, since the residual magnetization and the coercive force of the solid line a were larger than those of the broken line b, the multilayer was recognized as a perpendicular magnetic film. Both the residual magnetization and the coercive force were greatly increased in comparison with those before the annealing treatment, and the magnetization was difficult to saturate in the in-plane direction. That is, a good perpendicular magnetic film was produced. As to the magnetic characteristics of the perpendicular magnetic film, the coercive force was 5000 Oe, the squareness was 0.80 and the Faraday rotation angle was 1.0 deg/μm at a wavelength of 525 nm. The average grain size was 80 Å.

Example 6

The multilayer obtained in Example 2 was annealed at 350° C. for 2 hours in air. When the peak in the small-angle region of the X-ray diffraction spectrum which shows the lamination structure was observed in comparison with that before the multilayer had been annealed, the peak value after the annealing treatment was reduced. This shows that the annealing treatment caused relative diffusion of $Fe_3O_4$ and $Co_3O_4$, thereby forming the two intermediate layers (C) (120 Å based on one unit) containing $Fe_3O_4$ and $Co_3O_4$ as a solid solution between the layer (A') (20 Å based on one unit) containing $Fe_3O_4$ and the layer (B') (10 Å based on one unit) containing $Co_3O_4$.

Figure 4:
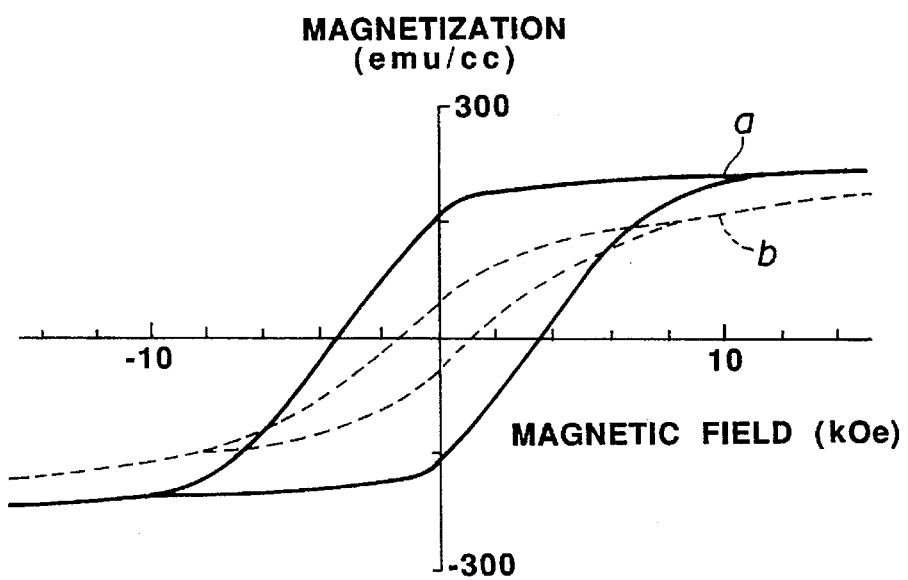
FIG. 4 is the magnetization curve of the laminated perpendicular magnetic film obtained in Example 6.
Figure 6:
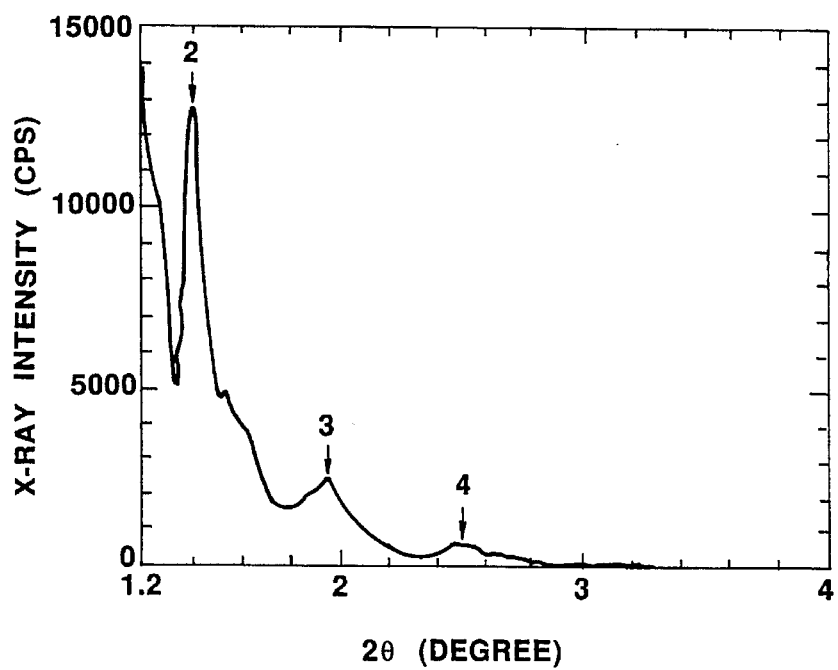
FIG. 6 shows the X-ray diffraction spectrum of the laminated perpendicular magnetic film obtained in Example 6 in the small-angle region.
Figure 7:
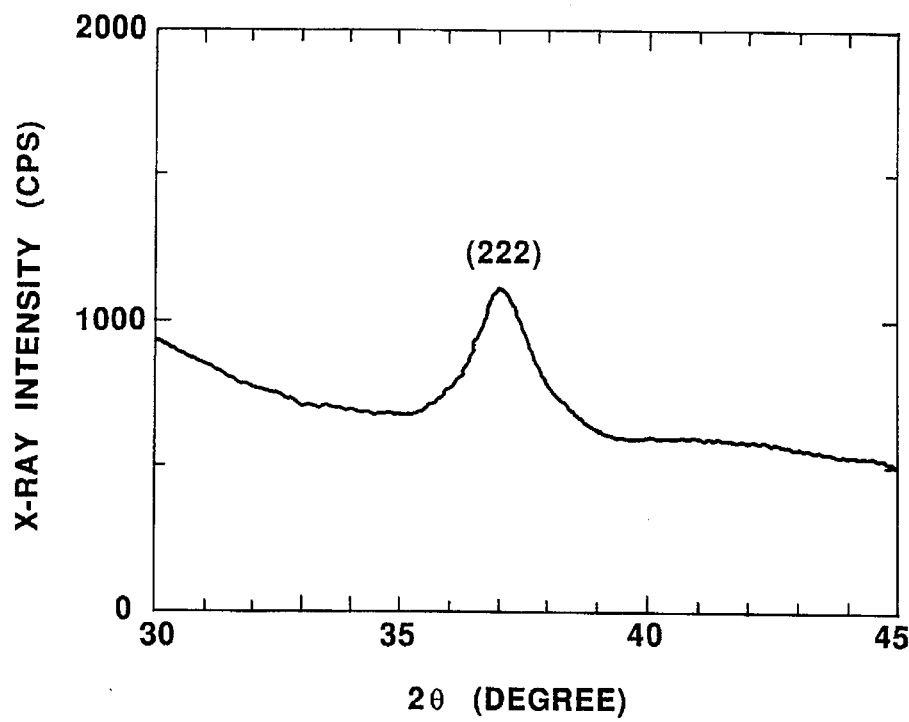
FIG. 7 shows the X-ray diffraction spectrum of the laminated perpendicular magnetic film obtained in Example 6 in the high-angle region.

The magnetization curve of the multilayer obtained is shown in FIG. 4. In FIG. 4, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 4, since the residual magnetization and the coercive force of the solid line a were larger than those of the broken line b, the multilayer was recognized as a perpendicular magnetic film. Both the residual magnetization and the coercive force were greatly increased in comparison with those before the annealing treatment, and the magnetization was difficult to saturate in the in-plane direction. That is, a good perpendicular magnetic film was produced. As to the magnetic characteristics of the perpendicular magnetic film, the coercive force was 3600 Oe and the squareness was 0.74. The wavelength dependence of the Faraday rotation angle of the perpendicular magnetic film is shown in FIG. 5, and the X-ray diffraction spectrum in the small-angle region and in the high-angle region are shown in FIGS. 6 and 7, respectively.

Figure 5:
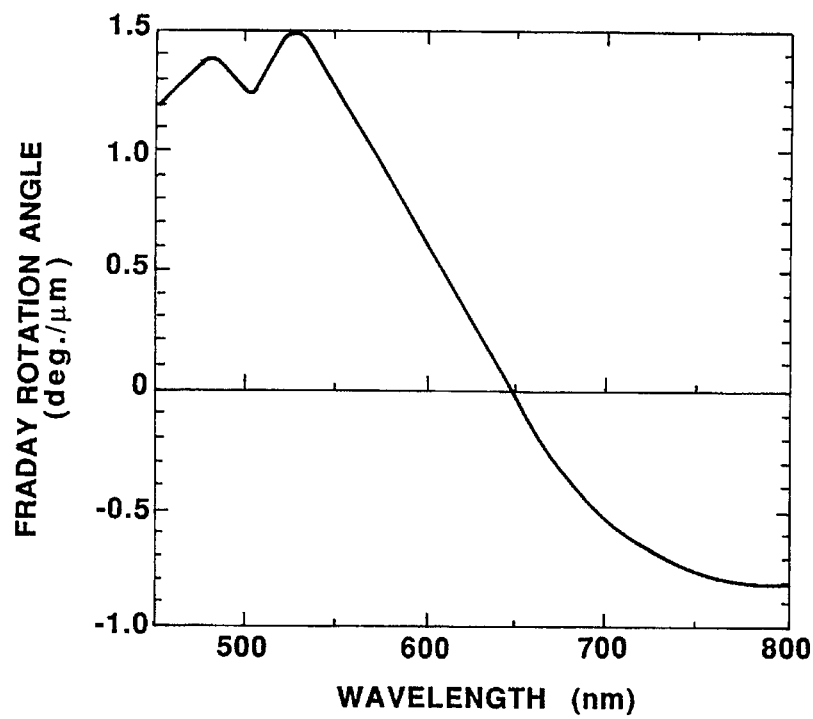
FIG. 5 shows the relationship between the Faraday rotation angle and the frequency of the laminated perpendicular magnetic film obtained in Example 6.

As shown in FIG. 5, the Faraday rotation angle at a wavelength of 525 nm in a short wavelength region was 1.5 deg/μm, which shows that the perpendicular magnetic film obtained had an excellent magneto-optical characteristic. As shown in FIG. 6, many peaks are shown in the film obtained, which indicates that the film had a lamination structure. The average grain size obtained by the calculation from the half band width of the peak shown in FIG. 7 was as small as not more than 60 Å.

Example 7

A perpendicular magnetic film was obtained in the same way as in Example 6, except that the annealing temperature was changed to 300° C. [the layer (A'): 90 Å based on one unit, the two layers (C): 160 Å based on one unit, the layer (B'): 50 Å based on one unit].

When the magnetization curve of the multilayer obtained was observed, the residual magnetization and the coercive force of the magnetization curve of the multilayer to which a magnetic filed was applied in the perpendicular direction were larger than those of the magnetization curve of the multilayer to which a magnetic filed was applied in the in-plane direction. As a result, the multilayer was recognized as a perpendicular magnetic film. As to the magnetic characteristics of the perpendicular magnetic film, the coercive force was 3500 Oe, the saturation magnetization was 220 emu/cc, the squareness was 0.75 and the wavelength dependence of the Faraday rotation angle was 1.2 deg/Åm at a wavelength of 525 nm. The average grain size was 60 Å.

Example 8

The multilayer obtained in Example 3 was annealed at 350° C. for 2 hours in the air. When the peak in the small-angle region of the X-ray diffraction spectrum which shows the lamination structure was observed in comparison with that before the multilayer had been annealed, the peak value after the annealing treatment was reduced. This shows that the annealing caused relative diffusion of $Fe_3O_4$ and $Co_3O_4$, thereby forming the two intermediate layers (C) (240 Å based on one unit) containing $Fe_3O_4$ and $Co_3O_4$ as a solid solution between the layer (A') (40 Å based on one unit) containing $Fe_3O_4$ and the layer (B') (20 Å based on one unit) containing $Co_3O_4$.

When the magnetization curve of the multilayer obtained was observed, the residual magnetization and the coercive force of the magnetization curve of the multilayer to which a magnetic filed was applied in the perpendicular direction were larger than those of the magnetization curve of the multilayer to which a magnetic filed was applied in the in-plane direction. As a result, the multilayer was recognized as a perpendicular magnetic film. As to the magnetic characteristics of the perpendicular magnetic film, the coercive force was 4500 Oe, the saturation magnetization was 220 emu/cc, the squareness was 0.75 and the wavelength dependence of the Faraday rotation angle was 1.2 deg/μm at a wavelength of 525 nm. The average grain size was 80 Å.

Comparative Example 1

A substrate placed with a distance of 80 mm from a metal (Fe) target was rotated at a constant rate of 10 rpm and the substrate temperature was held at 200° C. Sputtering was carried out in an oxidizing air under an oxygen partial pressure $PO_2=1.32\times10^{-4}$ Torr and a pressure of a sputtering gas (Ar) of 5 mTorr, thereby forming a spinel $Fe_3O_4$ on the substrate to a thickness of 3000 Å.

Figure 8:
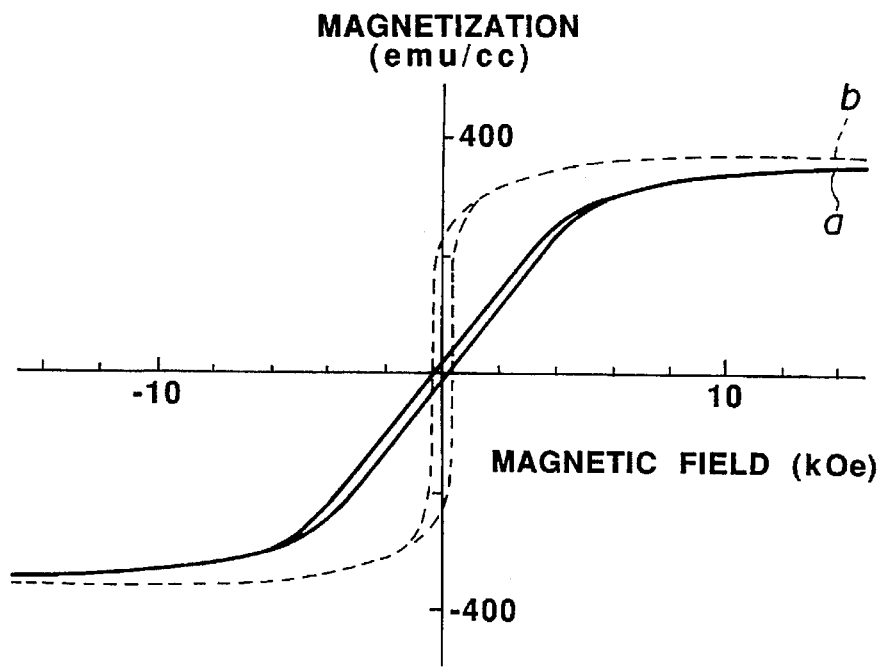
FIG. 8 is the magnetization curve of the spinel $Fe_3O_4$ layer obtained in Comparative Example 1.

The magnetization curve of the multilayer obtained is shown in FIG. 8. In FIG. 8, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 8, since the residual magnetization and the coercive force of the broken line b were larger than those of the solid line a, the multilayer was recognized as an in-plane magnetic thin film. As to the magnetic characteristics of the film in the perpendicular direction, the coercive force was 300 Oe and the squareness was 0.06.

Comparative Example 2

A spinel $Fe_3O_4$ film oriented in the film-surface direction of (111) was formed on a glass substrate which was held at 200° C. in an oxidizing air under an oxygen partial pressure $PO_2=1.32\times10^{-4}$ Torr, to a thickness of 200 Å as a first layer. The shutter was next rotated to form a CoO film of 100 Å in thickness as a second layer. These operations were alternately repeated 16 times to obtain a multilayer composed of 8 layers of $Fe_3O_4$ films each having a thickness of 200 Å, and 8 layers of CoO films each having a thickness of 100 Å. The making power at the time of film formation was 300 W on the Fe side and 200 W on the Co side.

Figure 9:
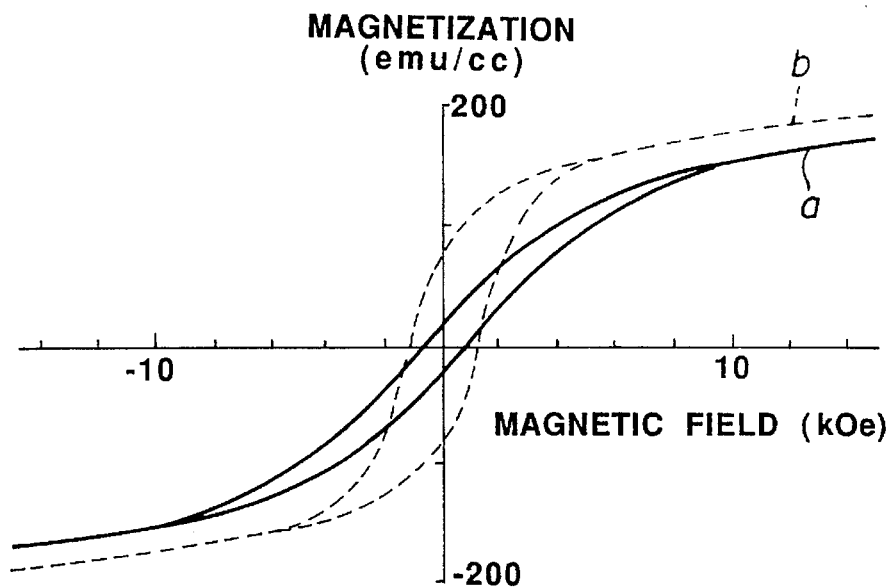
FIG. 9 is the magnetization curve of the laminated perpendicular magnetic film obtained in Comparative Example 2.

The magnetization curve of the multilayer obtained is shown in FIG. 9. In FIG. 9, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 9, since the residual magnetization and the coercive force of the broken line b were larger than those of the solid line a although the coercive force was increased in comparison with that of the single $Fe_3O_4$ film in Comparative Example 1, the multilayer was recognized as an in-plane magnetic thin film. As to the magnetic characteristics of the film in the perpendicular direction, the coercive force was 600 Oe and the squareness was 0.10.

Comparative Example 3

The multilayer obtained in Comparative Example 2 was annealed at 350° C. for 2 hours in air.

Figure 10:
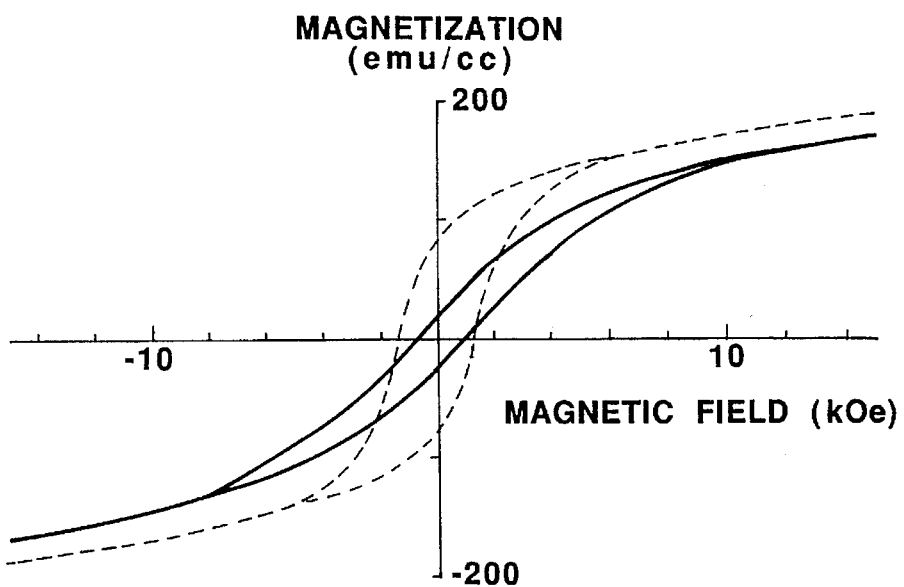
FIG. 10 is the magnetization curve of the laminated perpendicular magnetic film obtained in Comparative Example 3.

The magnetization curve of the multilayer obtained is shown in FIG. 10. In FIG. 10, the solid line a shows the magnetization curve of the multilayer to which a magnetic filed was applied in the perpendicular direction, and the broken line b shows the magnetization curve of the multilayer to which a magnetic filed was applied in the in-plane direction. As shown in FIG. 10, since the residual magnetization and the coercive force of the broken line b were larger than those of the solid line a although the coercive force was slightly increased in comparison with that before the annealing treatment, the multilayer was recognized as an in-plane magnetic thin film. As to the magnetic characteristics of the film in the perpendicular direction, the coercive force was 650 Oe and the squareness was 0.08.

What is claimed is:

1. A multilayer perpendicular magnetic film having a least four layers formed of at least two (A)/(B) or (B)/(A) units, the units disposed one atop the other, each unit having a layer (A) having a spinel crystal structure and represented by the following formula:

$$A_xFe_{3-x}O_4$$

wherein A represents Co, Ni and Mn, or x is not more than 1, disposed a layer (B) having a spinel crystal structure and represented by the following formula:

$$B_yCo_{3-y}O_4$$

wherein B represents Fe, Ni or Mn, and y is not more than 1, the oxide of each of said layer (A) and said layer (B) being respectively composed of spinel crystals having an average crystal grain size of 30 to 100 Å, the number of the (A)/(B) units or (B)/(A) units being 2 to 30, and the thickness of one unit (A)/(B) or (B)/(A) being less than 1000 Å.

2. A multilayer perpendicular magnetic film according to claim 1, wherein the thickness of said layer (A) is 0.5 to 4.0 times the thickness of one of said layer (B).

3. A multilayer perpendicular magnetic film according to claim 1, having a coercive force of 600 to 2500 Oe, a squareness of 0.3 to 0.5 and a saturation magnetization of not less than 180 emu/cc.

4. A multilayer perpendicular magnetic film having at least seven layers and comprising a (A') layer, at least one (C)/(B')/(C)/(A') unit and (C)/(B') layers, or a (B') layer, at least one (C)/(A')/(C)/(B') unit and (C)/(A') layers obtained by disposing a layer (A') having a spinel crystal structure and represented by the following formula:

$$A_xFe_{3-x}O_4$$

wherein A represents Co, Ni and Mn, and x is not more than 1, a layer (C) having a spinel crystal structure or represented by the following formula:

$$A'_a(Fe_{1-z}Co_z)_{3-a}O_4$$

wherein A' represents Ni and Mn, a is not more than 1, and z is more than 0 and less than 1 or changes continuously between 0 and 1, and a layer (B') having a spinel crystal structure and represented by the following formula:

$$B_yCo_{3-y}O_4$$

wherein B represents Fe, Ni and Mn, and y is not more than 1, in the order of (A'), (C), (B'), (C), (A'), (C) or (B'), or (B'), (C), (A'), (C), (B'), (C) and (A'), the oxide of each of said layer (A'), said layer (B') and said layer (C) being respectively composed of spinel crystals having an average grain size of 40 to 200 Å.

5. A multilayer perpendicular magnetic film according to claim 4, wherein the thickness of one unit (C)/(A'(C)/(B') or (C)/(A'/(C)/(B') is not more than 1000 Å.

6. A multilayer perpendicular magnetic film according to claim 4, wherein the number of the (C)/(A')(C)/(B') units or (C)/(A')/(C)/(B') units is 2 to 30.

7. A multilayer perpendicular magnetic film according to claim 4 wherein the thickness of said layer (A') is 0.5 to 4.0 times the thickness of one of said layer (B') and the thickness of said layer (C) is not less than 1 times the total thickness of said layers (A') and (B') in one unit.

8. A multilayer perpendicular magnetic film according to claim 4, having a coercive force of 1000 to 5500 Oe, a squareness of 0.5 to 0.9, a saturation magnetization of not less than 180 emu/cc and a Faraday rotation angle in a short wavelength region of 450 to 600 nm of 0.4 to 2.0 deg/μm.

9. A process for producing a perpendicular magnetic film having at least seven layers and comprising a (A') layer, at least one (C)/(B')/(C)/(A') unit and (C)/(B') layers, or a (B') layer, at least one (C)/(A')/(C)/(B') unit and (C)/(A') layers obtained by disposing a layer (A') having a spinel crystal structure and represented by the following formula:

$$A_xFe_{3-x}O_4$$

wherein A represents Co, Ni or Mn, and x is not more than 1, a layer (C) having a spinel crystal structure and represented by the following formula:

$$A'_a(Fe_{1-z}Co_z)_{3-a}O_4$$

wherein N represents Ni or Mn, a is not more than 1, and z is more than 0 and less than 1 and changes continuously between 0 and 1, and a layer (B') having a spinel crystal structure and represented by the following formula:

$$B_yCo_{3-y}O_4$$

wherein B represents Fe, Ni or Mn, and y is not more than 1, in the order of (A'), (C), (B'), (C), (A'), (C) and (B'), or (B'), (C), (A'), (C), (B'), (C) and (A'), the oxide of each of said layer (A'), said layer (B') and said layer (C) being respectively composed of spinel crystals having an average grain size of 40 to 200 Å, said process comprising the steps of:

(A) alternatively laminating a layer composed of an oxide having a spinel crystal structure and containing Fe as a main ingredient and a layer composed of an oxide having a spinel crystal structure and containing Co as a main ingredient, and (B) heat-treating the resulting multilayer film at 250° to 400° C. for 0.5 to 3.0 hours.

10. The multilayer perpendicular magnetic film produced by the process of claim 9.

11. A magnetic recording medium comprising a substrate, and formed on said substrate, multilayer perpendicular magnetic film having a least four layers and formed of at least two (A)/(B) or (B)/(A) units, the units disposed one atop the other, each unit having a layer (A) having a spinel crystal structure and represented by the following formula:

$$AxFe_{3-x}O_4$$

wherein A represents Co, Ni or Mn, and x is not more than 1, a layer (B) having a spinel crystal structure and represented by the following formula:

$$B_yCo_{3-y}O_4$$

wherein B represents Fe, Ni or Mn, and y is not more than 1, the oxide of each of said layer (A) and said layer (B) being respectively composed of spinel crystals having an average crystal grain size of 30 to 100 Å, the number of the (A)/(B) units or (B)/(A) units being 2 to 30, and the thickness of one unit (A)/(B) or (B)/(A) being less than 1000 Å.

12. A magnetic recording medium comprising a substrate, and formed on said substrate a perpendicular magnetic film having at least seven layers and comprising a (A') layer, at least one (C)/(B')/(C)/(A') unit and (C)/(B') layers, or a (B') layer, at least one (C)/(A')/(C)/(B') unit and (C)/(A') layers obtained by disposing a layer (A') having a spinel crystal structure and represented by the following formula:

$$A_xFe_{3-x}O_4$$

wherein A represents Co, Ni or Mn, and x is not more than 1, a layer (C) having a spinel crystal structure and represented by the following formula:

$$A'_a(Fe_{1-z}Co_z)_{3-a}O_4$$

wherein A' represents Ni or Mn, a is not more than 1, and z is more than 0 and less than 1 and changes continuously between 0 and 1, and a layer (B') having a spinel crystal structure and represented by the following formula:

$$B_yCo_{3-y}O_4$$

wherein B represents Fe, Ni or Mn, and y is not more than 1, in the order of (A'), (C), (B'), (C), (A'), (C) and (B'), or (B'), (C), (A'), (C), (B'), (C) and the oxide of each of said layer (A'), said layer (B') and said layer (C) being respectively composed of spinel crystals having an average grain size of 40 to 200.

* * * * *